United States Patent [19]

Kazin et al.

[11] 4,131,387
[45] Dec. 26, 1978

[54] CURVED BLADE TURBOMACHINERY NOISE REDUCTION

[75] Inventors: Stephen B. Kazin, West Chester; Ram K. Matta, Cincinnati, both of Ohio

[73] Assignee: General Electric Company, Cincinnati, Ohio

[21] Appl. No.: 662,150

[22] Filed: Feb. 27, 1976

[51] Int. Cl.² .................................... F01D 5/12
[52] U.S. Cl. ............................ 415/119; 415/181; 416/223 A
[58] Field of Search ............... 415/119, 181, 208, 209; 416/223 A

[56] References Cited

U.S. PATENT DOCUMENTS

| | | | |
|---|---|---|---|
| 1,062,258 | 5/1913 | Schlotter | 415/183 |
| 1,966,787 | 7/1934 | Buri | 415/119 |
| 2,029,813 | 2/1936 | DeMey | 415/119 |
| 2,142,307 | 1/1939 | DeMey et al. | 415/119 |
| 2,524,869 | 10/1950 | Adamtchik | 415/119 |
| 2,650,752 | 9/1953 | Hoadley | 415/DIG. 1 |
| 2,663,493 | 12/1953 | Keast | 415/199 R |
| 2,795,373 | 6/1957 | Hewson | 415/209 |
| 2,962,260 | 11/1960 | Foley | 416/223 A X |
| 2,991,929 | 7/1961 | Stalker | 415/181 |
| 3,237,849 | 3/1966 | Krell | 415/119 |
| 3,270,953 | 9/1966 | Jerie et al. | 415/119 |
| 3,458,116 | 7/1969 | Winkler et al. | 415/119 |
| 3,873,229 | 3/1975 | Mikolajczak et al. | 415/181 |
| 3,883,264 | 5/1975 | Rao | 415/208 X |
| 3,972,646 | 8/1976 | Brown | 415/119 X |
| 3,989,406 | 11/1976 | Bliss | 415/181 X |
| 3,995,970 | 12/1976 | Nobuyuki | 415/181 X |

FOREIGN PATENT DOCUMENTS

| | | | |
|---|---|---|---|
| 110505 | 1964 | Czechoslovakia | 415/181 |
| 631231 | 10/1949 | United Kingdom | 415/119 |
| 983469 | 2/1965 | United Kingdom | 415/119 |
| 1284341 | 8/1972 | United Kingdom | 415/119 |

Primary Examiner—Everette A. Powell, Jr.
Attorney, Agent, or Firm—Robert C. Lampe, Jr.; Derek P. Lawrence

[57] ABSTRACT

A turbomachinery stage comprising two axially spaced blade rows, one of which is rotatable, wherein the blades of the upstream row are contoured to present a leaned wake to the downstream row. In the preferred embodiment, the blades of the upstream row extend radially from a central hub and, at a radius above the hub, are physically curved circumferentially from a radial line through the hub. The physical lean locally complements the inherent aerodynamic lean at each radius such that the integrated acoustic power of the stage is essentially at a minimum, thus maximizing the acoustic attenuation. Preferably, the constraint is imposed that the blade physical curvature is essentially smooth, continuous and without an inflection point.

2 Claims, 6 Drawing Figures

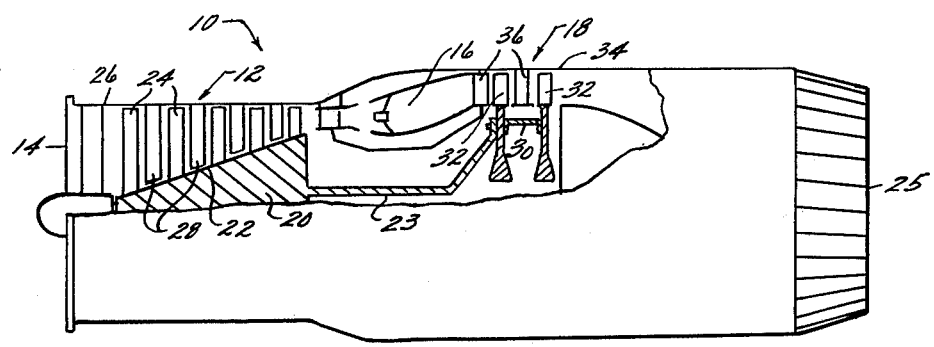
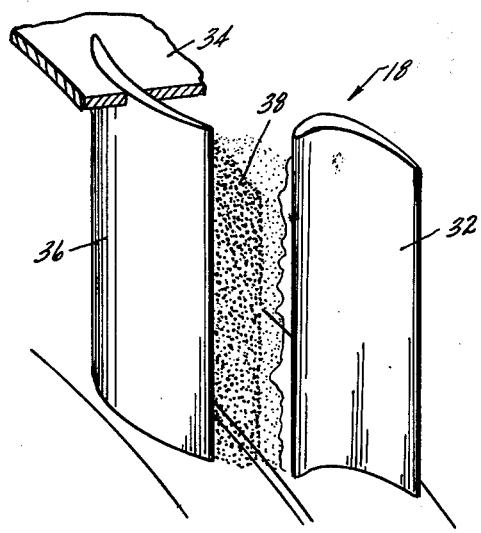
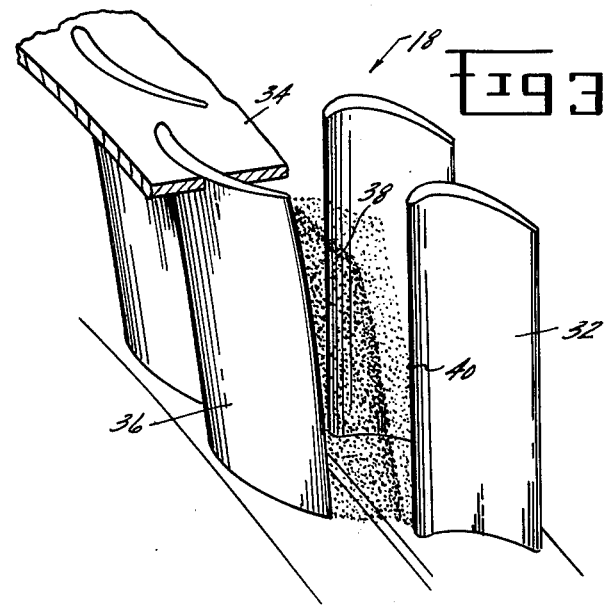
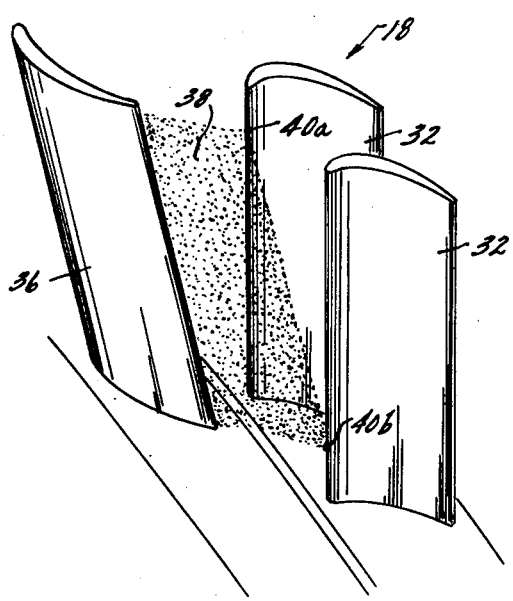
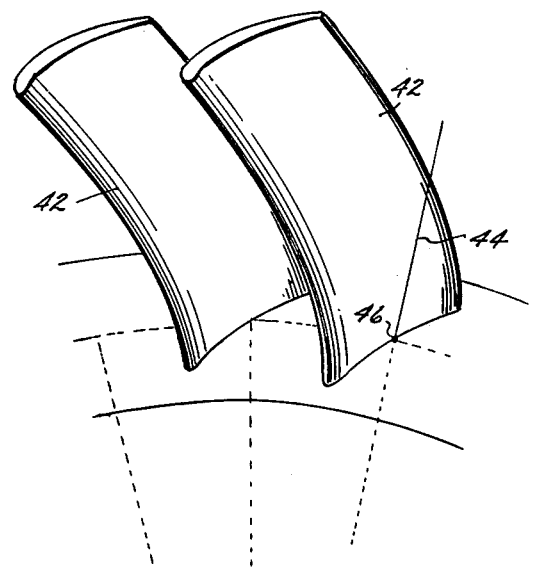

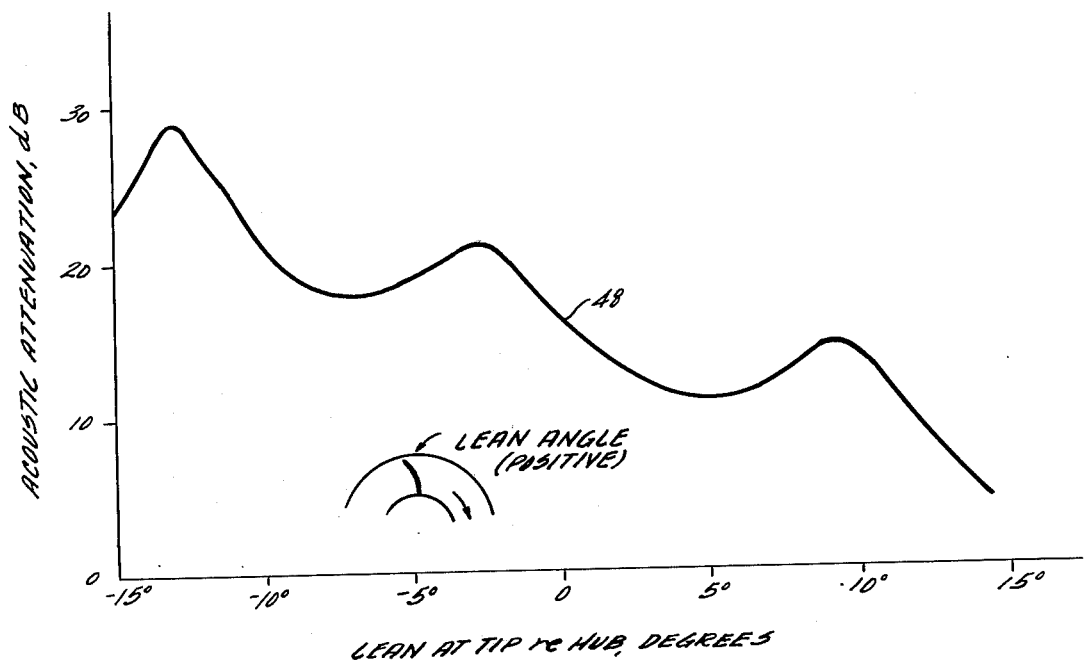

CURVED BLADE TURBOMACHINERY NOISE REDUCTION

BACKGROUND OF THE INVENTION

This invention relates to gas turbine engines and, more particularly, to reducing turbomachinery noise generated therein.

The invention herein described was made in the course of, or under, a contract (or grant) with the United States Department of Transportation.

With increased public concern over aircraft-generated noise, the aircraft gas turbine engine manufacturer is faced with the problem of developing new ways of effectively reducing noise. One of the noise sources is that associated with the viscous shearing between rapidly moving exhaust gases and the surrounding atmosphere, a phenomenon with which the present invention is not concerned. It is the noise generated by the turbomachinery within the gas turbine engine to which the present invention is directed. This turbomachinery noise results from the relative motion of adjacent blade rows, typical of those found in compressors (including fans) and turbines. For example, a compressor comprises multiple bladed stages, each stage including a rotatable blade row and a stationary blade row. It has long been recognized that in axial flow turbomachines one of the principal noise sources is the interaction between the wakes of stationary upstream blade rows and moving downstream blade rows (rotors). This so-called "viscous wake interaction" results in noise at the rotor blade passing frequency and at its harmonics.

One of the early methods employed to reduce this viscous wake interaction noise was to increase the axial spacing between the rotating and stationary blade rows. This modification provided space for the viscous wake to dissipate before reaching the downstream blade row, resulting in less blade passing frequency and harmonic noise.

Increased spacing can generally be applied to turbomachines with one or possibly two stages without seriously affecting the performance of the machine. However, if axial space is at a premium or if more than two stages are involved, increases in axial length of the machine may be restricted by weight, aerodynamic performance losses, cost and/or installation and space requirements. Thus, another means of reducing the viscous wake interaction effect is desirable.

SUMMARY OF THE INVENTION

Accordingly, it is the primary object of this invention to reduce turbomachinery noise without jeopardizing aerodynamic performance.

This, and other objects and advantages, will be more clearly understood from the following detailed description, the drawings and specific examples, all of which are intended to be typical of rather than in any way limiting to the scope of the present invention.

Briefly stated, the above objective is accomplished by uniquely combining the inherent aerodynamic lean within the wake of the upstream blade row of a turbomachinery stage with local physical blade lean to reduce the wake-blade interaction noise. It has been discovered that lean per se does not reduce noise due to wake-blade interaction but that noise attenuation varies in an undulating wave-like relationship with total vane lean, producing a series of maxima and minima values. This relationship is a function of the aerodynamic and physical parameters of the stage. Once this relationship is understood as taught herein, a stage may be designed with parameters consistent with one of the maximum attenuation points, with due consideration to practical matters such as ease of manufacture and cost, to ultimately determine the final configuration.

In one embodiment of the present invention, as a concession to aerodynamic performance, the blades of the upstream blade row extend generally radially from a central hub. However, at radii above the hub radius, the blades are locally leaned from a radial line through the hub, the lean at each radius complementing the inherent aerodynamic lean at that radius such that the integrated acoustic power of the stage is essentially at a minimum. The constraint is imposed that the blade's resulting physical curvature is essentially smooth, continuous and without an inflection point.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings in which:

FIG. 1 is a simplified, cross-sectional view of a typical gas turbine engine incorporating the present invention;

FIG. 2 schematically illustrates the concept of viscous wake-blade interaction in generally radial bladed stages;

FIG. 3 is similar to FIG. 2 and schematically illustrates the concept of leaning the blade wake to reduce the effects of wake interaction;

FIG. 4 schematically illustrates the concept of viscous wake interaction with multiple downstream blades;

FIG. 5 schematically depicts a turbomachinery blade designed in accordance with the present invention; and FIG. 6 graphically illustrates the variation in acoustic attenuation as a function of blade lean.

DESCRIPTION OF THE PREFERRED EMBODIMENT

Referring to the drawings wherein like numerals correspond to like elements throughout, attention is first directed to FIG. 1 wherein a typical gas turbine engine, depicted generally at 10, is diagrammatically shown. Briefly stated, the engine 10 comprises an axial flow compressor 12 which pressurizes the motive fluid (air) entering inlet 14 to support combustion of fuel in combustor 16. The hot gas stream generated by combustor 16 is expanded through and drives turbine 18 which, in turn, is drivingly connected to the rotor portion 20 of compressor 12 by shaft 23 in the usual manner of a gas turbine engine. After the gases have expanded through turbine 18, they are exhausted through nozzle 25 to generate a propulsive thrust to the left in FIG. 1.

Directing further attention to the compressor 12 of FIG. 1, it is shown that rotor portion 20 includes a flow path defining hub 22 which carries rows of rotor blades 24 in the conventional manner. Outer casing 26, surrounding rotor 20 and further defining the aerodynamic flow path, has similar rows of stator blades 28, each extending toward the opposing hub. As used herein, a compressor stage comprises an axially adjacent rotor row 24 and stator row 28. In a similar manner, turbine 18 comprises a rotor portion 30 including a hub carrying rows of rotating blades (buckets) 32. Casing 34 surrounding turbine rotor portion 30 carries cooperating rows of stationary stator vanes 36 between each pair of bucket rows 32. Typically, a turbine stage comprises an adjacent bucket row 32 and a vane row 36. Thus, it can be seen that in each gas turbojet engine there are two sources of viscous wake-blade row interaction, namely the compressor and turbine portions, and, therefore, two sources of turbomachinery noise.

Referring now to FIG. 2, a turbomachinery stage (herein, for sake of example, a turbine stage) is depicted, only one blade from each row being shown for clarity. As has been previously discussed, one of the principal noise sources in turbomachinery is the interaction between the wakes of stationary blade rows and the moving downstream rotors. As is well understood, the wakes are defined as the region of reduced momentum behind an airfoil evidenced by, and equal to, the profile drag of the airfoil. As illustrated, the upstream blade (stationary vane 36) sheds a viscous wake 38 which is impacted by representative downstream rotor blade 32. It has been shown that the greatest wake impact, and thus maximum noise, will occur if the upstream blade row's wake interacts with the downstream blade row simultaneously at all points along the span of the downstream blade row, the situation as depicted in FIG. 2. However, if the upstream blade is inclined relative to the downstream blade row, the viscous wake interaction will take place over a smaller part of the downstream blade row's span at any instant of time. In effect, the intersection of the wake with the downstream blade row travels radially along the span of the downstream blade row rather than impacting it all at once. This is illustrated in FIG. 3 where the traveling impact region is denominated 40 and the vane 36 has been leaned (tilted circumferentially from a radial line through the hub) to cause inclination of the wake. This reduces its interaction strength and, thus, reduces the blade passing frequency and harmonic noise.

At first it would appear that the more inclined or leaned the blade wake relative to the downstream blade row, the less noise would be generated since, the greater the lean angle (measured from a radial line), the smaller the span length that will be impacted at any one instant in time. However, in many high blade number, high solidity turbomachinery stages the lean angle does not have to be very large before the wake of the upstream blade row will be intersecting more than one downstream blade at the same time. FIG. 4 illustrates this situation for a case in which two blades 32 are intersected simultaneously, though not necessarily at the same radial location. In the worst case, the two intersections 40a, 40b will occur such that the generated resultant acoustic waves will be exactly in phase with each other. That is, the strength of the acoustic signal will be twice that which would occur if there was only one intersection. On the other hand, in the best case the two intersections will occur in such a manner that the resultant acoustic waves will be exactly out of phase. That is, the two acoustic waves will cancel each other and virtually no noise will be generated.

As shown in FIG. 1, in an actual turbomachine such as a gas turbine engine, there are many blades and, therefore, many wakes and far more than two downstream blade intersections may take place. When the multitude of intersections and their respective phase relationships are taken into account, it can be seen that mere arbitrary lean of the upstream blade wakes may, in fact, result in more noise being generated as lean is increased, rather than less. Thus, a detailed analysis of the problem is required to successfully apply the leaned wake principle to noise attenuation. In the world of turbomachinery design, mere trial and error techniques are so costly as to be prohibitive.

The foregoing considerations are particularly important in view of the fact that in most turbomachines the wakes trailing from the upstream blade rows are not straight. That is, due to their aerodynamic characteristics, there is a certain inherent aerodynamic lean built into the wake due to, for example, blade camber, stagger and aerodynamic loading, as can be appreciated by those familiar with turbomachinery design. Thus, it is conceivable that arbitrary physical blade lean could negate the blade aerodynamic or inherent lean (particularly if the two types of lean were in equal but opposite directions) and, thus create more noise than if the blades remained physically radial, possessed of merely their inherent lean.

It has been discovered that further design flexibility may be obtained with the leaned wake concept if, instead of specifying that the blade be straight, the blade is permitted to be curved. By allowing curvature, another independent parameter is introduced which can be uniquely specified in a manner now to be described so as to increase the phase cancellation effects and, thus, reduce noise.

Accordingly, it has been shown that a host of parameters must be considered and accurately specified in order to successfully reduce the viscous wake-blade interaction effect. In order to define the blade profile which will result in the most effective wake profile, an analysis has been developed which, when applied to a given turbomachinery stage, will uniquely define the upstream blade shape. The analysis begins by defining the physical characteristics of the turbomachinery stage for optimum performance at its design operating condition in the usual manner, such as designing for the cruise operating mode for an aircraft gas turbine engine. Then the radial distribution of circumferential lean for the upstream blade row is calculated such that the noise at this or any other desired operating condition is attenuated. For example, since the noise at the approach power condition is most offensive from aircraft gas turbine engines, the amount of lean necessary to reduce noise at this condition must be determined considering that the blade velocity triangles (and, therefore, physical characteristics such as blade chord, metal angles, solidity and the like) have been optimized for the cruise mode. The required lean distribution is determined by first defining the characteristics of the upstream blade's wake in terms of a pressure loss coefficient, $\zeta_P$ at that operating condition for which noise reduction is desired. This coefficient is determined by the method taught and described by Ainley and Mathieson in National Gas Turbine Establishment (NGTE) Reports R86 (1951) and R111 (1952). Briefly, the pressure loss coefficient takes into account the aerodynamic loading of the upstream blade row. That is, higher blade aerodynamic loadings result in greater total pressure losses which, in turn, imply stronger wakes.

Once the total pressure loss coefficient has been determined, utilizing the aerodynamic parameters consistent with the off-design operating condition for which noise reduction is desired and the physical parameters consistent with the design operating condition (which in some cases may be the same) it may be used along with other consistent off-design aerodynamic and design geometric parameters to specify a coefficient of unsteady upwash, $G_m$, on the downstream blade at several selected radii. Generally, the coefficient of unsteady upwash is related to the unsteady force on the downstream blade row, the transient pulse generated when the wake impacts the downstream blade row, and is the cause of the noise generated. $G_m$ is represented by the following relationship which appears in FAA Report No. FAA-RD-74-125, II, entitled "Vol. II — Identification of Noise Generation and Suppression Mechanisms," dated August 1974, pages 4-73:

$$G_m = K_1 \pi \frac{V_1 \delta_P \sin\beta}{V_2 (\frac{x'}{C_1} + .2) \cos\alpha_1} (\frac{x'}{C_1})^{\frac{1}{2}}$$

$$\exp\left[-\pi m^2 (\frac{K_2}{\cos\alpha_1})^2 \delta_P \sigma_1 \frac{x'}{C_1}\right]$$

where:
$V_1$ = relative velocity exiting the upstream blades;
$V_2$ = relative velocity entering the downstream blade row;
$C_1$ = semichord of the upstream blade row;
$x'$ = axial location of the point of the viscous wake interaction on the downstream blade measured from the midchord of the upstream blade;
$\alpha_1$ = absolute exit air angle from the upstream blade;
$\beta$ = upstream blade air turning angle;
$\sigma_1$ = upstream blade row solidity;
$\zeta_P$ = total pressure loss coefficient; and
m = the harmonic index. (m = 1, 2, 3 . . .)
$K_1, K_2$ = 1.391 and 0.283, respectively, for turbines
$K_1, K_2$ = 4.655 and 0.481, respectively, for compressors The coefficient of unsteady upwash may then be used to define an unsteady circulation, $\Gamma$, at each of the several preselected radii, r, wherein $\Gamma$, is represented by the relationship:

$$\Gamma(r) = C_2 V_2 |G_m| |J_m (m\omega_2)| |S_m (m\omega_2)|$$

where:
$C_2$ = semichord of the downstream blade row;
$V_2$ = relative velocity entering the downstream blade rows;
$G_m$ = coefficient of unsteady upwash;
$J_m$ = Bessel function of the first kind;
$S_m$ = Sears function;
$\omega_2$ = reduced frequency; and
m = harmonic index. (m = 1, 2, 3 . . .)

The unsteady circulation is, in turn, used to compute the coefficient of acoustic pressure, $A_{mn}$. In particular, $A_{mn}$ is represented by the expression:

$$A_{mn} = \frac{M}{4\pi m R_o c \zeta_{mn}} \int_h^{1.0} r\Gamma(r) R_{mn} (\lambda_{mn} r) e^{ikV\epsilon(r)} dr$$

where:
n = radial mode index;
m = harmonic index;
$R_o$ = tip radius;
c = speed of sound;
$\zeta_{mn}$ = norm of the cylinder function, $R_{mn}$;
r = radius;
$\Gamma(r)$ = unsteady circulation;
$R_{mn}(\lambda_{mn} r)$ = cylinder function;
$\lambda_{mn}$ = Eigenvalue;
i = square root of $-1$: $\sqrt{-1}$;
k = wave number;
h = radius ratio (hub radius/tip radius);
M = spinning mode number;
V = number of downstream blades; and $$\epsilon(r) = \Psi + \theta_e$$

where:
$\Psi$ = input physical lean angle; and
$\theta_3$ = aerodynamic lean angle.

Finally the coefficient of acoustic pressure is used to obtain the RMS acoustic pressure, $P_m$ for the fundamental tone;

$$P_m = \sum_{n=1}^{\infty} \rho c_2 n \omega A_{mn} R_{mn} (\lambda_{mn} r)$$

where:
$\rho$ = density
$\omega$ = circular frequency

These mathematics clearly may be programmed into an electronic computer so as to allow for rapid optimization of the upstream blade shape for a given set of aerodynamic parameters. Generally, a curved blade profile will result. The optimum profile will be that for which the total integrated acoustic power, $P_w$, is a minimum where:

$$P_w = 2\pi \int_{r_{hub}}^{r_{tip}} \frac{P_m^2}{\rho c} r dr$$

$r_{hub}$ = hub radius
$r_{tip}$ = tip radius
dr = incremental radius

In order to arrive at a blade profile which is acceptable from a mechanical and aerodynamic standpoint, the two constraints are placed upon the blade. First, it must have a continuous, smooth curve without inflection points and, secondly, it must be radial at the hub. The former is required in order to fabricate the blade at a reasonable cost and the latter is specified in order to reduce aerodynamic losses at the hub (i.e., minimize acute corners). Therefore, the theoretical optimum shape will be compromised somewhat by smoothing the profile consistent with the foregoing constraints. Of course, in those instances where the acoustic advantages outweigh the economic and aerodynamic penalties, the designer may well elect to fabricate a blade possessing the theoretical profile.

Thus, the resulting blade 42 will be generally as illustrated in FIG. 5, having a curved shape and locally leaned in the circumferential direction from a radial line 44 drawn through the hub 46.

The results for a typical turbine stage are shown in FIG. 6 wherein acoustic attenuation in decibels is plotted as a function of lean for a straight vane. Line 48 indicates the noise reduction of such a straight vane as the lean angle is changed from $-15°$ to $+15°$ lean relative to a radial line through the vane hub. The undulating wave-like variations clearly show that at some lean angles more noise reduction is obtained than at others and that if just a straight vane were considered it would be peferable to select a lean which would produce a "peak" attenuation rather than one which would lie in an attenuation "valley". Furthermore, even a curved vane would have a characteristic somewhat similar to that of FIG. 6, varying in an undulating wave-like manner as tip lean is varied for a given local radial lean distribution. However, point 50 indicates the acoustic attenuation available for an "optimized" curved vane contoured in accordance with the teachings of the present invention. Such a vane would be on or near a "peak" of a theoretical attenuation-lean curve if it were feasible to represent such a curve in FIG. 6. Thus, acoustic attenuation is at one of its maximum values when the acoustic power is minimized.

It should become obvious to one skilled in the art that certain changes can be made to the above-described invention without departing from the broad inventive concepts thereof. For example, the subject invention is clearly equally applicable to rotors and stators and it matters little from the acoustic point of view whether it is a first or second blade row in the stage which is rotating. Further, though the equations represented herein are necessarily explicit, it is recognized that minor or inconsequential refinements and departures therefrom would still be within the scope of the present invention.

Having thus described the invention, what is considered novel and desired to be secured by Letters Patent of the United States is:

1. In an aircraft gas turbine engine turbomachinery stage comprising adjacent upstream and downstream blade rows, one of which is rotatable, the improvement wherein the blades of the upstream row are physically curved with a local physical radial lean distribution in the circumferential direction such that the sum of the physical lean and the inherent aerodynamic lean in the circumferential direction results in the integrated acoustic power, $P_w$, of the bladed stage being essentially at a minimum at the flight approach power operating condition where $P_w$ is generally defined by the relationship:

$$P_w = 2\pi \int_{r_{hub}}^{r_{tip}} \frac{P_m^2}{\rho c} r\, dr, \text{ where:}$$

$r_{hub}$ = upstream blade row hub radius;
$r_{tip}$ = upstream blade row tip radius;
$P_m$ = RMS acoustic pressure;
$\rho$ = motive fluid density;
c = acoustic velocity (speed of sound);
r = radius; and
dr = incremental radius.

2. In an aircraft gas turbine engine turbomachinery stage comprising axially spaced upstream and downstream blade rows, one of which is rotatable, the improvement wherein the blades of the upstream blade row extend generally radially relative to a central hub and, at radii above the hub, are physically curved and possessed of a local physical lean distribution such that the sum of the physical lean and the blade inherent aerodynamic lean in the circumferential direction results in the relationship of acoustic attenuation as a function of lean being essentially at one of its maximum values by minimizing the integrated acoustic power, $P_w$, at the flight approach power operating condition where $P_w$ is generally defined by the relationship:

$$P_w = 2\pi \int_{r_{hub}}^{r_{tip}} \frac{P_m^2}{\rho c} r\, dr, \text{ where:}$$

$r_{hub}$ = upstream blade row hub radius;
$r_{tip}$ = upstream blade row tip radius;
r = radius
$P_m$ = RMS acoustic pressure;
$\rho$ = motive fluid density;
c = acoustic velocity (speed of sound); and
dr = incremental radius.

* * * * *